United States Patent [19]

Lorenzo et al.

[11] Patent Number: 5,786,092
[45] Date of Patent: Jul. 28, 1998

[54] PEELABLE LAMINATE

[75] Inventors: Tina V. Lorenzo; Jeff C. McConnell, Jr., both of Spartanburg, S.C.; Curtis R. Rubinstein, Lake Zurich, Ill.; Palmer L. Whisenant, Moore, S.C.

[73] Assignee: W.R. Grace & Co.-Conn., Duncan, S.C.

[21] Appl. No.: 553,937

[22] Filed: Nov. 6, 1995

Related U.S. Application Data

[63] Continuation-in-part of Ser. No. 342,947, Nov. 21, 1994, abandoned.

[51] Int. Cl.$^6$ .................................................... B32B 27/00
[52] U.S. Cl. ............................... 428/423.1; 428/424.2; 428/458; 428/461; 428/474.4; 428/475.2; 428/475.8; 428/476.3; 428/480; 428/483; 428/500; 428/520; 427/207.1; 156/244.11
[58] Field of Search ............................... 428/500, 520, 428/423.1, 424.2, 458, 461, 474.4, 475.2, 475.8, 476.3, 480, 483; 427/207.1; 156/244.11

[56] References Cited

U.S. PATENT DOCUMENTS

| | | | |
|---|---|---|---|
| 4,680,340 | 7/1987 | Oreglia et al. | 525/72 |
| 4,875,587 | 10/1989 | Lulham et al. | 206/484 |
| 4,886,615 | 12/1989 | Dehan | 510/296 |
| 4,886,690 | 12/1989 | Davis et al. | 428/36.6 |
| 4,889,731 | 12/1989 | Williams, Jr. | 426/106 |
| 5,078,301 | 1/1992 | Gladfelter et al. | 222/52 |
| 5,281,027 | 1/1994 | Thrall | 383/88 |
| 5,316,688 | 5/1994 | Gladfelter et al. | 510/224 |
| 5,403,589 | 4/1995 | Edwards et al. | 424/405 |
| 5,441,805 | 8/1995 | Kwok | 428/339 |
| 5,468,526 | 11/1995 | Allen et al. | 428/35.4 |

FOREIGN PATENT DOCUMENTS

| | | |
|---|---|---|
| 0328317 | 8/1989 | European Pat. Off. |
| 0457600 | 11/1991 | European Pat. Off. |
| 0514172 | 11/1992 | European Pat. Off. |
| 0608801 | 8/1994 | European Pat. Off. |
| 608801-A | 8/1994 | European Pat. Off. |
| 06329820-A | 6/1995 | Japan |
| 06329821A | 6/1995 | Japan |
| 07195647-A | 12/1995 | Japan |
| 93/22215 | 11/1903 | WIPO |

Primary Examiner—Leszek Kiliman
Attorney, Agent, or Firm—Mark B. Quatt

[57] ABSTRACT

A peelable laminate comprises a water soluble substrate and a water insoluble web peelably adhered to the water soluble substrate. The peelable laminate can be made by e.g. coextrusion or lamination processes, and used to package fertilizer, caustic materials, and other products. A process for making the laminate, and a package made from the laminate are also disclosed.

26 Claims, 3 Drawing Sheets

PEELABLE LAMINATE

This application is a continuation-in-part of U.S. Ser. No. 08/342,947, filed Nov. 21, 1994, now abandoned.

BACKGROUND OF THE INVENTION

The present invention relates to a peelable laminate having a water soluble component.

Caustic or potentially hazardous materials such as detergents, soaps, plant protection agents, dyes for the textile industry, concrete additives, and fertilizers are typically packaged in dispensers, such as high density polyethylene bottles, or other containers. After the chemical contents of the container have been used, the empty dispenser or container must be disposed of in an environmentally safe way. This can be technically difficult and expensive.

Another concern with the use of such caustic or otherwise potentially hazardous chemicals or other materials is the safety of the user. In installing, using, and disposing of dispensers or containers containing such materials, the safety of the user can be jeopardized if the dispensing or storage system is not properly handled.

Water soluble films are useful in many applications in addressing these problems. These applications include the packaging of detergents, fertilizers, and other products. Such films offer the advantage of containing a product inside a package made from the film until ready for use. When the product is needed, the package is immersed in water or some aqueous based medium to dissolve the contents of the package in the aqueous medium while additionally dissolving the packaging material itself. Such uses offer an environmentally attractive alternative to containers which do not dissolve, and must therefore be disposed of after use.

However, a typical problem encountered when using many water soluble films is the fact that the same feature of the film which makes it useful in the above described applications, i.e. its ability to dissolve in water, also makes it difficult to store and handle prior to use because of contact with wet hands in for example a warewashing environment (e.g. commercial dishwashing), or in other environments where premature exposure to moisture poses a significant problem. Premature dissolution of the film containing a product can of course result in destruction or degradation of the product. In some instances this can pose a danger to the user if the contents of the package are caustic, toxic, or otherwise dangerous to handle or inhale.

Various solutions to this problem have been presented, including the use of overwrap packages (i.e. a primary packaging material including the water soluble film, and a secondary overwrap package of an insoluble material), or the use of a complex multilayer packaging material which can be difficult to produce.

The use of discrete overwrap bags, pouches or film or sheet, or other outer container, requires that a separate packaging material must be independently made, and then after the primary package containing the detergent, fertilizer, etc. has been made, the overwrap material must be applied and sealed or otherwise closed around the primary package. This involves an additional cost not only in terms of material and time, but also in process steps.

There is therefore a real need in the marketplace to provide water soluble functionality in a packaging film in a way which protects the user and contents from premature dissolution of the film during handling, but at the same time conveniently provides the water soluble functionality at the time that the contained product is to be used.

The inventors have found that this can be achieved by incorporating a water insoluble web and a water soluble substrate in a single peelable laminate.

The present invention provides a peelable laminate which can effectively and efficiently store a quantity of a product. A water insoluble web, forming part of the laminate, can be peeled away from the laminate prior to product use, leaving a water soluble substrate.

DEFINITIONS

"Water soluble" as used herein refers to polymeric materials which are soluble in water.

"Substrate" as used herein means a film, web, laminate, sheet, or the like, of monolayer or multilayer construction.

"Adhesive" as used herein means a material, or state of a surface, capable of bonding one surface to another surface. Such material is preferably polymeric in nature, and can be polyurethane adhesive.

"Copolymer" herein includes polymeric materials having two or more different comonomers.

"HDPE" herein means high density polyethylene.

"EVA" herein means ethylene vinyl acetate copolymer.

"ADH" herein refers to a polymeric adhesive. "$ADH_1$" refers to an anhydride-grafted polyolefin in EVA.

"Laminate" is used herein to mean a film, web, or other packaging material of more than one layer, made by e.g. coextrusion, lamination (extrusion, thermal, or coreactant solvent-based or water-based adhesive system), coating, or other processes.

"PVOH" refers to polyvinyl alcohol.

"AAS" refers to acid/acrylate/styrene terpolymer.

"ABP" refers to acrylate-based polymer.

"MF" refers to metalized film.

SUMMARY OF THE INVENTION

In one aspect of the invention, a peelable laminate comprises a water soluble substrate and a water insoluble web peelably adhered to the water soluble substrate.

In another aspect of the invention, a process for making a peelable laminate comprises providing a water soluble substrate, providing a water insoluble web, and laminating the water soluble substrate to the water insoluble web such that the water insoluble web is peelably adhered to the water soluble substrate.

In still another aspect, a process for making a laminate comprises coextruding a water soluble substrate and a water insoluble web such that the water insoluble web is peelably adhered to the water soluble substrate.

BRIEF DESCRIPTION OF THE DRAWINGS

The invention may be further understood with reference to the drawings wherein.

DESCRIPTION OF THE PREFERRED EMBODIMENTS

Figure 1:
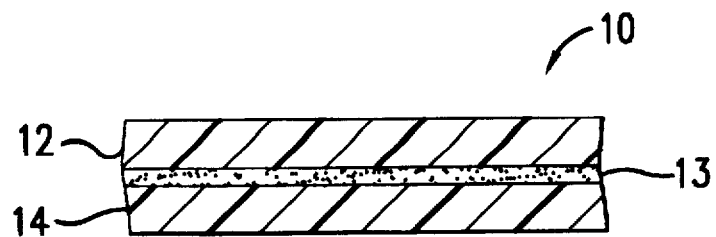
FIG. 1 is a schematic cross-section of a film of the present invention.

Referring to FIG. 1, a peelable laminate 10 comprising a water soluble substrate 14 and a water insoluble web 12 is shown. Reference numeral 13 of FIG. 1 denotes a peel interface.

Any of the peelable laminate 10, water soluble substrate 14, or water insoluble web 12 can be produced by any conventional means, including coextrusion, lamination (extrusion, thermal, or coreactant solvent-based or water-based adhesive system), extrusion coating, corona bonding, or other suitable means.

Figure 2:
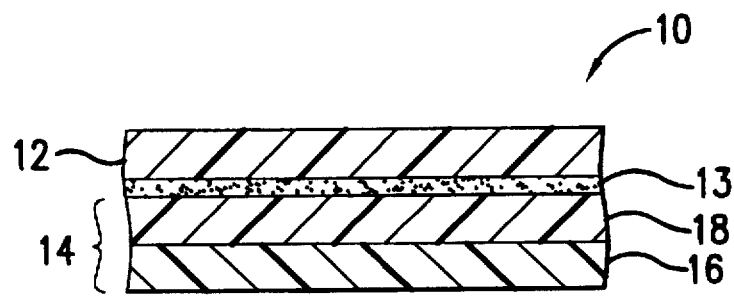
FIG. 2 is a schematic cross-section of an alternative embodiment of the invention.

In FIG. 2, a peelable laminate is shown in which the water insoluble web is shown as a monolayer material, and the water soluble substrate is shown as a two layer film or laminate having layers 16 and 18.

Figure 3:
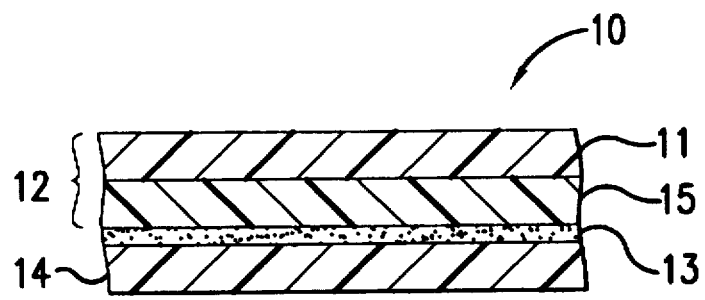
FIG. 3 is a schematic cross-section of still another alternative embodiment of the invention.

In FIG. 3, a peelable laminate 10 is shown in which the water soluble substrate 14 is shown as a monolayer material, and the water insoluble peelable web 12 is shown as a laminate comprising layers 11 and 15.

Suitable materials for water soluble substrate 14 include fully hydrolyzed polyvinyl alcohol; partially hydrolyzed polyvinyl alcohol; polyethers such as polyethylene oxide; acrylate based polymer such as acid/acrylate copolymer or terpolymer such as ethacrylic acid/ethyl acrylate copolymer and acid/acrylate/styrene terpolymer; styrene maleic anhydride copolymer (SMA); ethylene acrylic acid copolymer (EAA), ethylene methacrylic acid copolymer (EMAA), or metal salt neutralized ethylene methacrylic acid copolymer known as ionomer, in which the acid content of the EAA or EMAA is at least about 20 mole percent; polylactide (polylactic acid); polysaccharide such as cellulose, such as cellulose ether, such as hydroxy propyl cellulose, such as hydroxypropyl methyl cellulose; polyether polyamide copolymer such as polyether block amide copolymer; polyhydroxy butyric acid or polyhydroxy valeric acid; water soluble polyester or copolyester; polyethyloxazoline; water soluble polyurethane; partially metal salt neutralized acid/acrylate copolymer; a blend of acid/acrylate copolymer and ionomer; or blends of any of these materials.

Commercial polyvinyl alcohol is available from Air Products.

Polyether is available from Mitsubishi Plastics Company.

Another commercial example of polyether is available from Planet Polymer Technologies as Enviroplastic-H™.

A commercial example of polyethylene oxide is available from Union Carbide as Polyox™.

A commercial example of ethacrylic acid/ethyl acrylate copolymer is available from Belland as GBC 2580 and 2600.

Acid/acrylate/styrene terpolymer is available from Belland.

A commercial example of styrene maleic anhydride copolymer (SMA) is available from Monsanto as Scripset™.

Commercial ionomers are available from du Pont.

Polylactide is available from Ecochem and Cargill.

Hydroxy propyl cellulose is available from the Aqualon Division of Hercules as Klucel™.

Hydroxypropyl methyl cellulose is available from Dow Chemical as Methocel™.

Polyhydroxy butyric acid and polyhydroxy valeric acid are available from Imperial Chemical Industries as Biopol™.

A commercial example of polyethyloxazoline is available from Dow as PEOX 200™.

In the case of a multilayer water soluble substrate 14, layers 16, 18, and any additional layers can likewise can be any of the above referenced materials.

Water insoluble web 12 can comprise any suitable material as long as it is substantially water insoluble, and can be peelably adhered to the water soluble substrate.

The water insoluble web 12 can comprise a polymer; metal foil, film, sheet, or coating; a metalized foil, film, or sheet; a paper, or paper coated with a polymeric coating such as a high density polyethylene coating; or inorganic coating such as a silicon coating.

Suitable materials include high density polyethylene; low density polyethylene; ethylene alpha olefin copolymer such as linear low density polyethylene, very low density polyethylene, ultra low density polyethylene and metallocene catalyzed polymer; ethylene unsaturated ester copolymer such as ethylene vinyl acetate copolymer and ethylene alkyl acrylate copolymer; ethylene acid copolymer such as ethylene acrylic acid copolymer and ethylene methacrylic acid copolymer; propylene polymer and copolymer such as metallocene catalyzed propylene copolymer; vinylidene chloride polymer and copolymer; polyvinyl chloride; polyamide; polyalkylene carbonate; polystyrene; polyhydroxyaminoether; or blends of any of these materials.

Preferred materials are those which are not only water insoluble, but also act as moisture barriers. These materials which have a moisture vapor transmission rate (MVTR) of preferably less than 100, more preferably less than 75, most preferably less than 50, such as less than 25, less than 20, less than 15, less than 10, less than 5, and less than 1 gm/24 hours, 100 square inches (ASTM F 1249 for values at 20 grams or lower; ASTM E 96 for values above 20 grams) at 100% relative humidity.

Either or both of the water soluble substrate and water insoluble peelable web can comprise more than two layers. For example, either or both can have up to nine layers or more made up of materials such as those referenced above, in any suitable combination to provide a water soluble substrate which will substantially dissolve when the substrate is exposed to water, and a water insoluble peelable layer which will protect the contents of a package made from the peelable laminate from premature dissolution of the contents of a package made from the peelable laminate, and premature dissolution of the water soluble substrate before use, but can be peeled from the substrate prior to use.

Peel interface 13 can denote a discrete layer of either the water soluble substrate 14 or peelable water insoluble web 12 which permits peeling of the water insoluble portion of the laminate away from the water soluble portion. It can also denote a weak interlaminar plane of adhesion between adjacent layers (for example in a coextruded film), or can denote a corona treated surface or surfaces, or an interface between a substrate and a coating formed from an extrusion coating operation or a liquid coating, or an adhesive interface in a laminated structure, or the like.

In embodiments where the peelable interface 13 comprises an adhesive, the adhesive can be chosen from any suitable material which acts to peelably bond water insoluble web 12 to the water soluble substrate 14. The peeling mechanism can occur by means of interlaminar peeling, i.e. delamination along the plane indicated by 13 in FIGS. 1 and 2, and FIG. 3.

Figure 6:
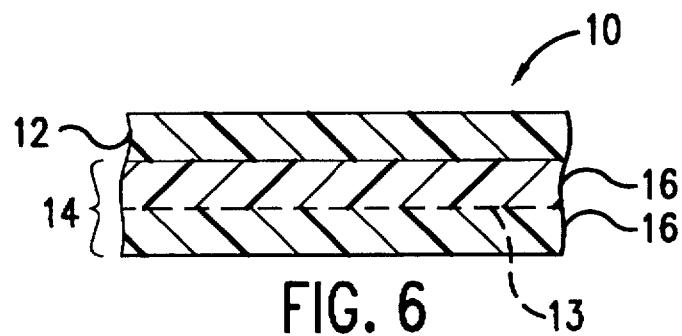
FIG. 6 is a schematic cross section of the laminate of the present invention peelable in an intersubstrate mode.

Intersubstrate delamination can occur as a result of delamination within the water soluble substrate, for example along the interface between layers 16 and 18. As shown in FIG. 6, a dashed line 13 indicates the plane of delamination for a peelable laminate.

Figure 7:
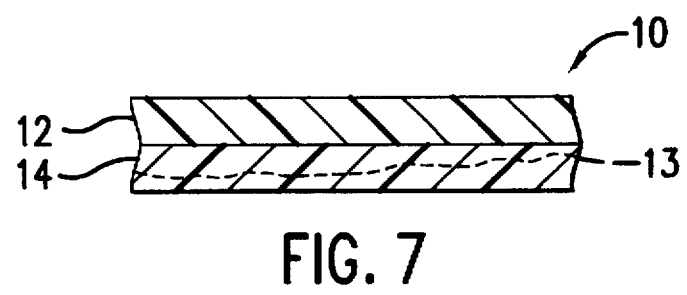
FIGS. 7 and 8 are schematic cross sections of the laminate of the present invention peelable in a cohesive failure mode.

Peeling can occur, in an alternative embodiment, at least partially as a result of cohesive failure within the layer 14 (FIG. 1), or layers 16 or 18 (FIG. 2) or other layer of the water soluble substrate, if the water soluble substrate has a multilayer construction. When this mode of failure occurs, a portion of e.g. layer 14 or 18 will be removed from the water soluble substrate when the water insoluble peelable web is peeled away. This will sometimes be acceptable, in that the remaining packaging material will be water soluble. A cohesive failure mode is shown by reference to a dotted line 13 in FIG. 7.

Figure 8:
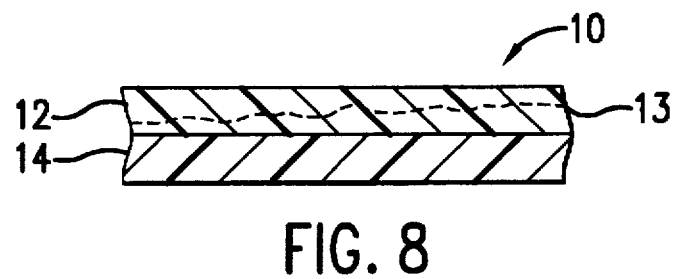

Peeling can also occur, in an alternative embodiment, at least partially as a result of cohesive failure within the layer 12 (FIG. 1), or layers 11 or 15 (FIG. 3) or other layer of the water insoluble web, if the water insoluble web has a multilayer construction. When this mode of failure occurs, a portion of e.g. layer 12 or 15 will be removed from the water insoluble web when the water insoluble peelable web is peeled away. If this occurs, a portion of water insoluble material will be adhered to the water soluble substrate when the package containing a water soluble product is ultimately placed in a dispenser, or otherwise used in an end use environment. This will often be less desirable because it will leave a residue of water insoluble material, and may in some cases interfere with the proper operation of the packaged product. A cohesive failure mode is shown by reference to a dotted line 13 in FIG. 8.

In practice, depending on the nature of the heat seals and conformation of the package, the types of materials used, and other factors, actual peeling may occur by any of the indicated mechanisms or a combination of them. Thus, for example, peeling may occur by a combination of cohesive failure within the water soluble substrate or water insoluble web, and some delamination along adjacent layers within the substrate or web, or between the substrate and web.

The peelable laminate of the present invention may be made into packages such as pouches, bags, or other containers, by any known means, including thermoforming, lidstock, horizontal form-fill-seal, vertical form-fillseal, vacuum skin packaging, or other means.

Figure 4:
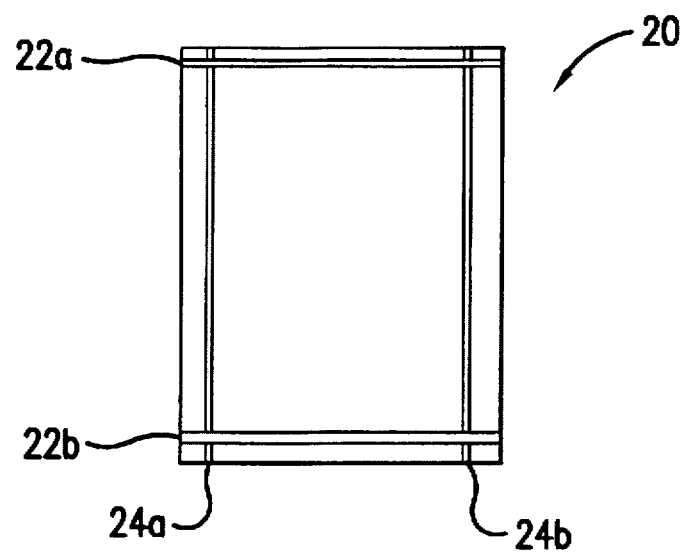
FIG. 4 is a plan view of a package made from the laminate of the present invention.
Figure 5:
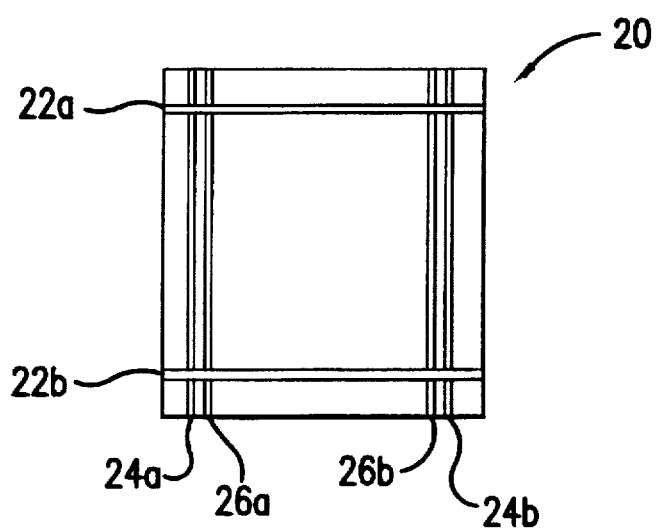
FIG. 5 is another embodiment of a package made from a laminate of the present invention.

Referring to FIGS. 4 and 5, FIG. 4 shows a "single T" sealed package 20 made from the peelable laminate 10 of the invention. Longitudinal seals 22a and 22b made by heating, radio frequency, or other suitable sealing mechanisms are traversed by single transverse seals 24a and 24b. In FIG. 5, a "double T" sealed package shows the same longitudinal seals as FIG. 4, but with transverse seals which are double seals 24a and b, and 26a and b disposed respectively towards opposite ends of the package. The outer water insoluble web may be peeled from the water soluble substrate of laminate 10 by initiating peel at one of the points on the package where one of the seals is located.

Other peel initiation means are known, such as manual pull tabs shown for example in U.S. Pat. No. 4,889,731 (Williams, Jr.) and U.S. Pat. No. 4,886,690 (Davis et al), both incorporated herein by reference. Any suitable peel initiation means can be used in connection with this invention.

The invention may be further understood by reference to the examples shown in Tables 2 and 3. Table 1 identifies the resins used in the examples. Of the Examples listed in Table 2, Examples 1–9 and 19–21 were coextruded by conventional means. Double diagonals in Table 2 indicate the peel interface, i.e. the plane in the film at which peeling occurs.

Of Examples 10–18, some were coextruded, and showed little or no peel strength after coextrusion, and in some cases readily delaminated. These had peel strengths of generally less than 0.05 pounds per linear inch.

Examples 22 through 25 were made on a Randcastle bench-mounted cast extrusion system.

Examples 26–29 include "$MF_1$", referring to a polypropylene metalized film from Norprop films, 380NMTCW. This was a polypropylene to which a metalized aluminum coating had been applied. These four structures were produced by thermal lamination. The water soluble substrate was adhered to the polypropylene side of the metalized film. Other metalized films can also be used, with aluminum or other metals applied to polypropylene or other polymers in any suitable arrangement.

TABLE 1

| MATERIAL | TRADENAME | SOURCE |
|---|---|---|
| $HDPE_1$ | FORTIFLEX J60-800C-147 | SOLVAY |
| $HDPE_2$ | FORTIFLEX J60-500C-147 | SOLVAY |
| $EVA_1$ | PE1345 YY | REXENE |
| $EVA_2$ | EXXON LD-318.92 | EXXON |
| $EVA_3$ | ELVAX 3165 | DUPONT |
| $EVA_4$ | NA 295-000 | QUANTUM |
| $EVA_5$ | PE1375 | REXENE |
| $ADH_1$ | PLEXAR 107 | QUANTUM |
| $PVOH_1$ | VINEX 2144 | AIR PRODUCTS |
| $PVOH_2$ | VINEX 1003 | AIR PRODUCTS |
| $PVOH_3$ | AX-2000 | NIPPON GOHSEI |
| $PVOH_4$ | AX 300 SN | NIPPON GOHSEI |
| $AAS_1$ | — | BELLAND |
| $AAS_2$ | — | BELLAND |
| $ABP_1$ | — | NIPPON SHOKUBAI |
| $MF_1$ | 380NMTCW | NORPROP |

TABLE 2

| EXAMPLE | STRUCTURE | THICKNESS (MILS) |
|---|---|---|
| 1 | $HDPE_1/EVA_1//PVOH_1$ | 3.7 |
| 2 | $HDPE_1/EVA_1//PVOH_1$ | 5.0 |
| 3 | $HDPE_1//PVOH_1/PVOH_2$ | 4.5 |
| 4 | $HDPE_1/ADH_1//PVOH_1$ | 3.6 |
| 5 | $HDPE_1/ADH_1//AAS_1$ | 5.5 |
| 6 | $HDPE_1/ADH_1//AAS_1$ | 3.5 |
| 7 | $HDPE_1/ADH_1//ABP_1$ | 2.5 |
| 8 | $HDPE_1/ADH_1//ABP_1$ | 3.0 |
| 9 | $HDPE_1/ADH_1//PVOH_1$ | 6.0 |
| 10 | $HDPE_1//PVOH_1$ | 3.0 |
| 11 | $HDPE_1//PVOH_1$ | 4.0 |
| 12 | $HDPE_1//PVOH_1/PVOH_2$ | 4.0 |
| 13 | $HDPE_1//PVOH_1/ABP_1$ | 4.0 |
| 14 | $HDPE_1//ABP_1$ | 3 |
| 15 | $HDPE_1//PVOH_1/AAS_1$ | 3.0 |
| 16 | $HDPE_1//PVOH_1/AAS_1$ | 4.0 |
| 17 | $HDPE_1//PVOH_1/AAS_1$ | 5.0 |
| 18 | $HDPE_1//PVOH_1/PVOH_3$ | 4.0 |
| 19 | $HDPE_2/EVA_1//AAS_2$ | 5.8 |
| 20 | $HDPE_2/EVA_1//AAS_2$ | 7.3 |
| 21 | $HDPE_2/EVA_1//AAS_2$ | 7.3 |
| 22 | $HDPE_2/EVA_1//PVOH_4/AAS_2$ | 3.0 |
| 23 | $HDPE_2/EVA_2//PVOH_1$ | 2.5 |
| 24 | $HDPE_2/EVA_3//PVOH_1$ | 2.5 |
| 25 | $HDPE_2/EVA_4//PVOH_1$ | 2.5 |
| 26 | $MF_1/EVA_2//PVOH_1$ | 4.4 |
| 27 | $MF_1/EVA_3//PVOH_1$ | 5.5 |
| 28 | $MF_1/EVA_3//PVOH_1$ | 5.0 |
| 29 | $MF_1//PVOH_1$ | 2.4 |

Several peelable laminate samples were tested for peel strength. These peel strengths were obtained by following the procedure of ASTM F-904, but wherein ply separation was mechanically initiated. The results are given in Table 3.

TABLE 3

Peel Strength of Peelable Laminates
Peel Strength
(Pounds/Inch)

| EXAMPLE | Sample 1 | Sample 2 | Sample 3 | Average | S. Dev. |
|---|---|---|---|---|---|
| 1 | * | * | * | * | |
| 2 | * | * | * | * | |
| 3 | * | * | * | * | |
| 4 | ** | ** | ** | ** | |
| 5 | 0.7 | 0.4 | 0.2 | 0.4 | 0.25 |
| 6 | 0.3 | 0.2 | 0.2 | 0.2 | 0.06 |
| 7 | 1.3 | 0.6 | 0.9 | 0.9 | 0.35 |
| 8 | 0.8 | 0.7 | 0.7 | 0.7 | 0.06 |
| 26 | 0.009 | 0.014 | −0.006*** | 0.011 | 0.004 |
| 27 | 0.012 | 0.009 | 0.009 | 0.010 | 0.002 |
| 28 | 0.008 | 0.010 | 0.007 | 0.008 | 0.002 |
| 29 | 0.013 | 0.008 | 0.017 | 0.012 | 0.004 |

S. Dev. = Standard deviation
*Peel strength < 0.1 pounds/linear inch
**Could not be peeled apart.
***Sample excluded from average because of error in testing procedure.

Preferred peel strengths range from 0.005 to 5 pounds/linear inch, more preferably 0.005 to 4 pounds/linear inch, such as 0.005 to 3 pounds/linear inch or 0.005 to 2.5 pounds/linear inch, and most preferably 0.05 to 2 pounds/linear inch, such as from 0.1 to 1 pound/linear inch.

Peelable laminates of the present invention preferably range in thickness from 0.2 to 20 mils and are more preferably between about 2 and 15 mils in thickness. Of this total thickness, the water soluble substrate and water insoluble web can each form between 0.5 and 99.5% of the total laminate thickness, more preferably between 1 and 99% of the total laminate thickness, most preferably between 5 and 95% of the total laminate thickness. Optimal thicknesses will depend at least in part on the intended end-use, packaging format, and cost considerations.

What is claimed is:

1. A peelable laminate comprising:
   a) a water soluble substrate; and
   b) a water insoluble web peelably adhered to the water soluble substrate.

2. The laminate of claim 1, wherein the laminate comprises an adhesive disposed between and peelably adhering the water soluble substrate to the water insoluble web.

3. The laminate of claim 1, wherein the laminate comprises a corona treated surface of at least one of the water soluble substrate or the water insoluble peelable web, whereby the water soluble substrate and the water insoluble web peelably adhere to each other.

4. The laminate of claim 1, wherein the water soluble substrate and the water insoluble peelable web form a single coextruded laminate.

5. The laminate of claim 1 wherein the water soluble substrate comprises a material selected from the group consisting of fully hydrolyzed polyvinyl alcohol, partially hydrolyzed polyvinyl alcohol, polyether, acrylate based polymer, styrene maleic anhydride copolymer, ethylene acrylic or methacrylic acid copolymer with an acid content of at least 20 mole percent, ionomer, polylactide, polysaccharide, polyether polyamide copolymer, polyhydroxy butyric acid, polyhydroxy valeric acid, polyester, copolyester, polyethyloxazoline, polyurethane, partially metal salt neutralized acid-acrylate copolymer, a blend of acid-acrylate copolymer and ionomer, and blends of any of these materials.

6. The laminate of claim 1, wherein the water soluble substrate comprises an alkaline soluble layer, and a water soluble layer.

7. The laminate of claim 6, wherein the substrate comprises an inner alkaline soluble layer, an intermediate structural layer, and an outer water soluble layer.

8. The laminate of claim 1, wherein the water insoluble peelable web comprises a moisture barrier polymeric material.

9. The laminate of claim 8 wherein the moisture barrier polymeric material has a moisture vapor transmission rate of less than 100 grams/24 hours, 100 square inches (ASTM F 372) at 100% relative humidity.

10. The laminate of claim 1, wherein the water insoluble web comprises more than one layer.

11. A process for making a peelable laminate comprising:
   a) providing a water soluble substrate;
   b) providing a water insoluble web; and
   c) laminating the water soluble substrate to the water insoluble web such that the water insoluble web is peelably adhered to the water soluble substrate.

12. The process of claim 11 wherein the water insoluble web is peelably adhered to the water soluble substrate by laminating the web to the substrate by means of an adhesive.

13. The process of claim 11 wherein the water insoluble web is peelably adhered to the water soluble substrate by corona treating a surface of the substrate or the web, and laminating the substrate and web together.

14. The process of claim 11 wherein the water insoluble web is peelably adhered to the water soluble substrate by extrusion coating the web onto the substrate.

15. The process of claim 11 wherein the water insoluble web is peelably adhered to the water soluble substrate by extrusion coating the substrate onto the web.

16. The process of claim 11 wherein the water insoluble web is peelably adhered to the water soluble substrate by heat laminating the web onto the substrate.

17. The process of claim 11 wherein the water insoluble web is peelably adhered to the water soluble substrate by extrusion laminating the web onto the substrate.

18. The process of claim 11 wherein the water insoluble web is peelably adhered to the water soluble substrate by coextruding the water soluble substrate and the water insoluble web together such that the water insoluble web is peelably adhered to the water soluble substrate.

19. A package comprising:
   a) an article; and
   b) a peelable laminate containing the article, the laminate comprising
      i) a water soluble substrate; and
      ii) a water insoluble web adhered to the water soluble substrate;
   wherein the water insoluble web is capable of being peeled away from the water soluble substrate.

20. The package of claim 19 wherein the water soluble substrate forms an inner portion of the package, and the water insoluble web forms an outer portion of the package, such that the water soluble substrate is closer to the article than the water insoluble web.

21. The laminate of claim 1 wherein the water insoluble web is peelably adhered to the water soluble substrate with a peel strength of between 0.05 and 2 pounds per linear inch.

22. The laminate of claim 1 wherein the water insoluble web is peelably adhered to the water soluble substrate with a peel strength of between 0.1 and 1 pound per linear inch.

23. The process of claim 11 wherein the water soluble substrate is laminated to the water insoluble web such that the water insoluble web is peelably adhered to the water soluble substrate with a peel strength of between 0.05 and 2 pounds per linear inch.

24. The process of claim 11 wherein the water soluble substrate is laminated to the water insoluble web such that the water insoluble web is peelably adhered to the water soluble substrate with a peel strength of between 0.1 and 1 pound per linear inch.

25. The package of claim 19 wherein the water insoluble web is adhered to the water soluble substrate with a peel strength of between 0.05 and 2 pounds per linear inch.

26. The package of claim 19 wherein the water insoluble web is adhered to the water soluble substrate with a peel strength of between 0.1 and 1 pound per linear inch.

* * * * *